United States Patent [19]

Ravinet

[11] Patent Number: 4,611,841
[45] Date of Patent: Sep. 16, 1986

[54] PANEL RETAINING ARRANGEMENT

[75] Inventor: Ernest Ravinet, Richmond, Ind.

[73] Assignee: The Tappan Company, Mansfield, Ohio

[21] Appl. No.: 617,754

[22] Filed: Jun. 6, 1984

[51] Int. Cl.⁴ .............................................. E04C 3/04
[52] U.S. Cl. .................................................. 292/241
[58] Field of Search ...................... 52/766, 767, 127.7, 52/127.8, 127.9, 127.11; 292/240, 241, 242; 411/452

[56] References Cited

U.S. PATENT DOCUMENTS

| | | | |
|---|---|---|---|
| 707,858 | 8/1902 | Mendenhall | 292/241 |
| 1,276,932 | 8/1918 | King | 292/241 |
| 1,686,468 | 10/1928 | Rosenberg | 411/452 |
| 1,764,118 | 7/1930 | Potterf | 292/241 |
| 1,783,150 | 11/1930 | Jeffery | 292/240 |
| 1,993,519 | 3/1935 | Miltenberger | 411/452 |
| 2,251,202 | 7/1941 | Purtell | 411/452 |
| 2,468,646 | 4/1949 | Verhoff | 292/241 |
| 2,634,146 | 4/1953 | Johnson | 292/240 |
| 2,642,242 | 6/1953 | Karitzky | 411/452 |
| 2,820,209 | 1/1958 | Whitted | 411/452 |

Primary Examiner—John E. Murtagh
Attorney, Agent, or Firm—Alfred E. Miller

[57] ABSTRACT

The invention relates to panels, such as are provided in cabinets or the like. Rabbets are provided in a frame for receiving a panel. Mortises are provided extending in the frame from the rabbets, and rotatable retaining elements are mounted in the mortises. The rotatable retainers are comprised of a ramp encircling them for a portion of their circumference, having one flat circumferential side that is alignable with the side of the rabbet in the frame. Accordingly, upon rotation of the retainer, the ramp, or screw thread, engages the side of the panel away from the bottom of the rabbet, to hold the panel fully against the bottom of the rabbet, independently of the thickness of the panel.

4 Claims, 9 Drawing Figures

PANEL RETAINING ARRANGEMENT

This invention relates to panels such as are provided in cabinets or the like, for example of wood or synthetic materials, and is particularly directed to an arrangement facilitating the changing of such panels.

On occasion it is desirable to be able to remove and replace the panels of cabinets or the like. Such removal or replacement may be desired, for example, for esthetic reasons, for example, to enable the matching of the cabinets or the like with other pertinences. Such removal and replacement may also be desirable in order to enable cleaning or refinishing.

In the past many techniques have been employed for the purpose of removably holding panels in frames, such as the frames defining cabinets doors. In the past devices for removably retaining panels have generally either been complicated, expensive, or adapted only to hold panels of a predetermined thickness in their edge regions.

Accordingly, the present invention is directed to the provision of an economical panel holding arrangement which is easily operable, and which is adaptable to hold panels of varying thickness in their edge regions.

Briefly stated, in accordance with the invention, rabbets are provided in a frame for receiving a panel. Mortises are provided extending in the frame from the rabbets, and rotatable retaining elements are mounted in the mortises. The rotatable retainers are comprised of a ramp encircling them for a portion of their circumference, having one flat circumferential side that is alignable with the side of the rabbet in the frame. Accordingly, upon rotation of the retainer, the ramp, or screw thread, engages the side of the panel away from the bottom of the rabbet, to hold the panel fully against the bottom of the rabbet, independently of the thickness of the panel.

In order that the invention will be more clearly understood it will now be disclosed in greater detail with reference to the accompanying drawing, wherein.

Figure 1:
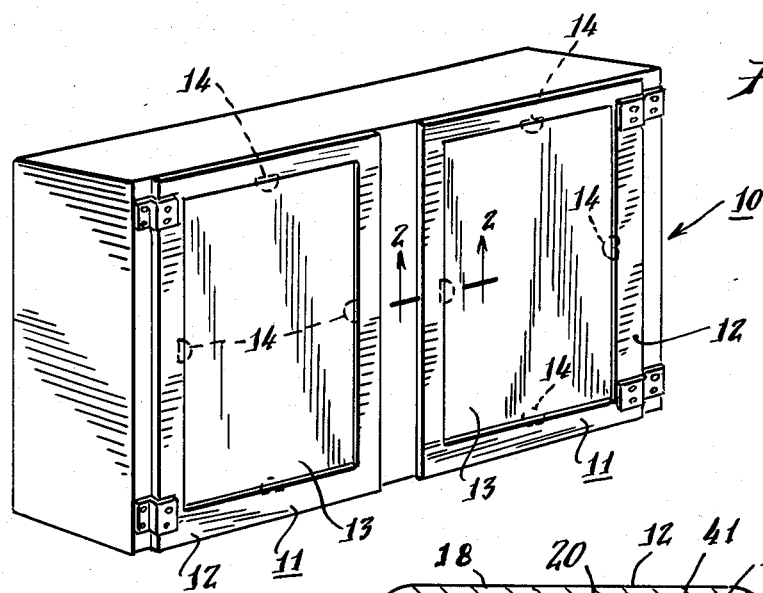
FIG. 1 is a perspective view of a cabinet of the type incorporating the panel retaining arrangement of the invention.

Referring now to the drawings, FIG. 1 illustrates a cabinet or cupboard 10 of the type which may employ the panel retainers of the invention. The cabinet 10 has a plurality of hinged doors 11 comprised of hinged frames 12 holding central panels 13. Each panel 13 is held in its respective frame by a plurality of retainers 14 while FIG. 1 illustrates four retainers holding each panel, it is apparent that any desired number of such retainers may be employed.

Figure 2:
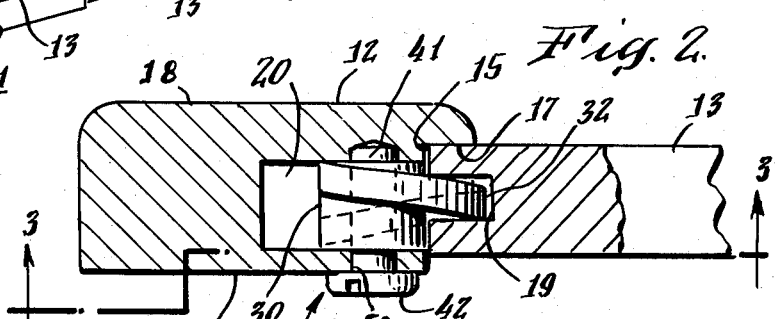
FIG. 2 is an enlarged partial cross section of the cabinet of FIG. 1, taken along the lines II—II.

As illustrated in FIG. 2, the frame 12 is provided with a rabbet 15 extending from the inside surface 16 of the frame, thereby providing a shoulder 17 spaced from the front surface 18 of the frame, against which the front surface of the panel 13 may rest. The panel 13 has a plow or groove 19 in its edges. Such plows or grooves may be provided throughout the extent of the panel, or, preferably, only in the regions adjacent the retainers 14.

The frame 12 is further provided with a mortise 20 extending from the rabbet 15, in the region of each of the retainers 14. The mortise 20 thus extends parallel to and between the inner and other faces 16 and 18 of the frame 12.

Figure 4:
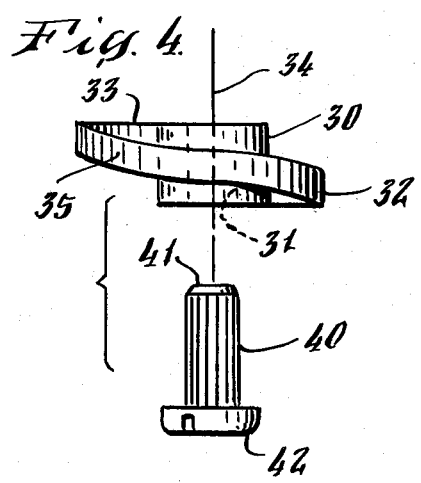
FIG. 4 is an exploded view of a retainer assembly in accordance with the embodiment of the invention of FIGS. 2 and 3.
Figure 3:
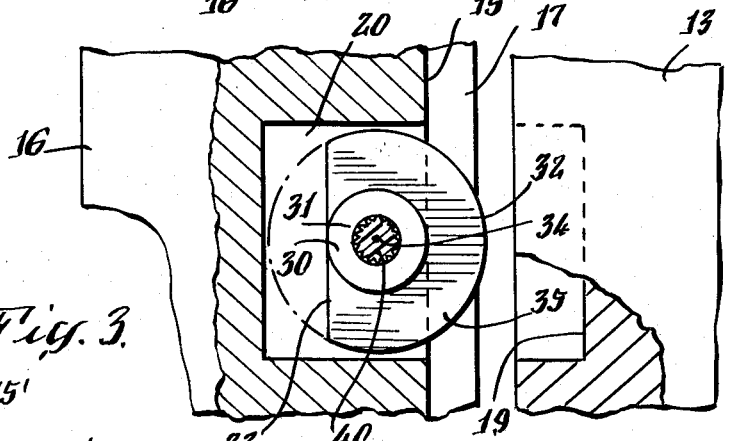
FIG. 3 is a partial cross sectional view of FIG. 2, taken along the lines III—III.

The retainer itself, as illustrated in FIGS. 2, 3 and 4, is preferably comprised of a hub 30, having a generally circular cross section and a central hole 31 extending axially therethrough. A ramp or spiral projection 32 encircles part of the hub 30, the ramp terminating at each end in a plane 33 parallel to the axis 34 on the hub and spaced a distance from said axis substantially equal to the radius of the hub. The axially directed surfaces 35 of the ramp are defined by lines extending transversely of the axis 34, thereby forming a smooth spiral surface, with the cross section of the ramp being substantially rectangular.

The ramp 32 defines a portion of a turn, with one surface 35 intersecting the plane of one end of the hub at the plane 33, and the other surface 35 intersecting the plane of the other end of the hub at the plane 33.

The retainer 14 is further provided with a pin 40 adapted to be received in the central hole 31 of the hub with a force fit. For this purpose, for example, the size of the pin 40 may be serrated. One end 41 of the pin 40 is chamfered and the other end 42 defines a slotted head.

As illustrated in FIG. 2, a hole 50 is provided in the frame, at the center of the mortise, extending from the inner surface 16 through the mortise, and extending a short distance beyond the mortise, i.e., most completely to the outer surface 18. The axis or the hole 50 is spaced from the edge of the rabbet a distance substantially equal to the distance between the axis 34 of the hub and the plane 33 of the edge of the hub.

As illustrated in FIGS. 2 and 3, the hub is inserted in the mortise, in alignment with the hole 50, and the pin 42 is inserted in the hole 50 and is forced into the hub, until the head 42 of the pin comes substantially into engagement with the surface 16 of the frame. The ramp 32 may thus be rotated, for example by means of a screwdriver engaged in the slotted head 42.

When the ramp 32 is turned to a position that the plane 33 thereof is in substantial alignment with the side of the rabbet 15, it is apparent that a panel 13 may be easily inserted in the rabbet, to engage the shoulder 17, or removed therefrom. When a panel is thus inserted in the rabbet, the retainer 14 may be rotated, by means of the slotted head 42, so that the ramp 32 enters the plow 19 of the panel. Upon continued rotation of the ramp, in assembly of a panel in the door, one surface 35 of the ramp engages the side of the plow 19 to force the panel against the shoulder 17, thus to firmly position the panel in the door.

Since the panel is held in position by the ramp engaging the side of the plow 19, it is apparent that the thickness dimensions of the panel, or the spacing between the plow 19 and the surfaces of the panel, may be varied without hindering the retaining function of the retainers 14. The clamping of panels of different dimension is hence accommodated merely by different angular displacements of the ramp. It is of course further apparent that, during assembly of a panel in the door, the plow 19 may be initially aligned with the portion of the ramp toward the inner surface 16 of the frame, so that rotation of the ramp may carry the panel to its final position.

The hub and ramp may be formed as a unitary member, for example of plastic, and the pin 40 may also be formed of a plastic material.

Figure 5:
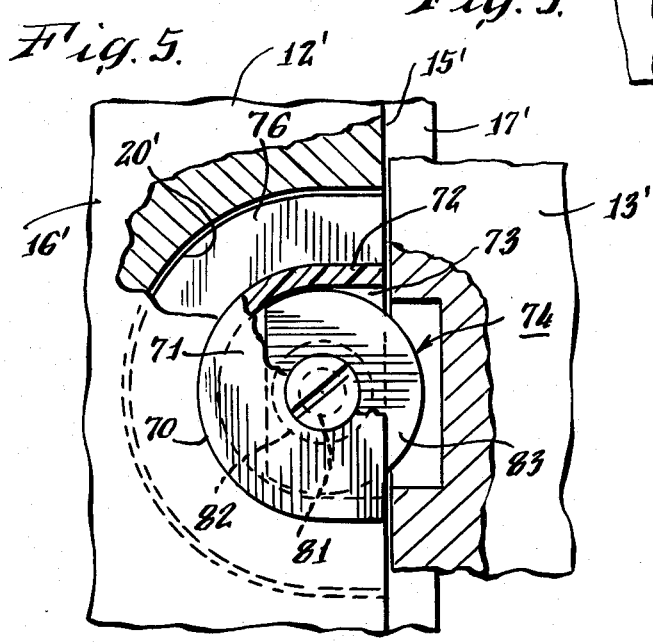
FIG. 5 is a partial cross section of a modified panel retaining arrangement in accordance with the invention.
Figure 6:
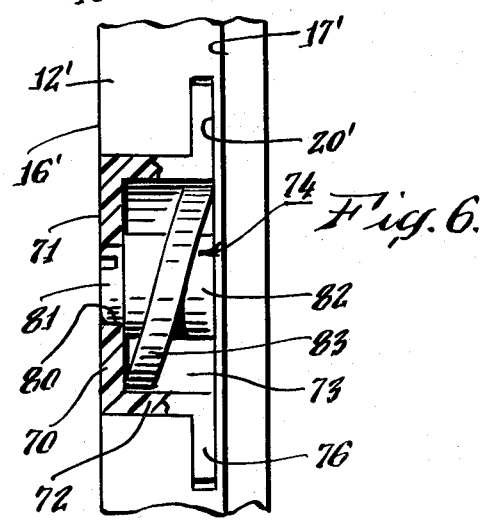
FIG. 6 is a partially cross section side view of a portion of the retainer of FIG. 5.

In the modification of the invention illustrated in FIGS. 5 and 6, the mortise 20' in the frame 12' extends to the inner surface 16'. An insert 70, for example of molded or machined plastic, is inserted in the mortise 20', the mortise 20' being configured to receive the insert 70. The insert 70 has a portion 71 generally flush with the surface 16' of the frame, the portion 71 having a generally D-shaped outline. The central portion 72 of the insert extends from the edges of the outer portion 71, to define a generally D-shaped chamber 73 for receiving the hub and ramp assembly 74. The insert 70 is further provided with an outwardly extending flange portion 76. The flange portion 76, as illustrated in FIG. 5, is also generally D-shaped.

A hole 80 is provided extending through the portion 71 of the insert 70 for receiving a slotted projection 81 extending axially from the hub 82. The hub 82 is configured substantially the same as in the embodiment of FIGS. 2-4, with the exception that it is not provided with a central hole, the projection 81 being formed integrally with the hub. The ramp 83 surrounding the hub is also formed as discussed above with reference to FIGS. 2-4.

In the embodiment of the invention illustrated in FIGS. 5 and 6, the hub assembly is initially assembled with its slotted projection 81 extending into the hole 80 of the insert. The insert 70 is then inserted in the correspondingly shaped mortise 20' of the frame 12'. The insert 70 may be held by dimensioning the mortise to provide a force fit, or, alternatively, suitable adhesives may be employed for this purpose. It is to be noted that the hub is held in the mortise, in this arrangement, by the close engagement between the slotted projection 81 and the hole 80, whereby no further holding means is required.

Figure 7:
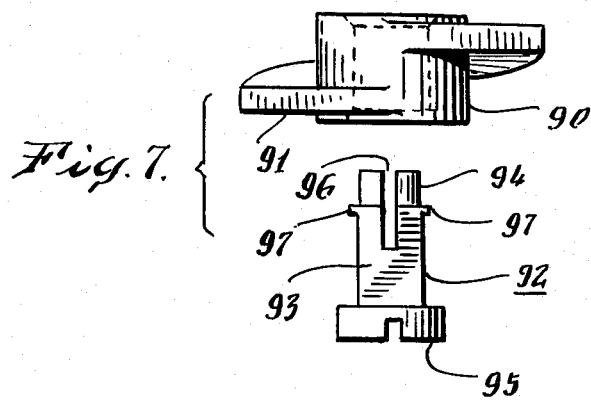
FIG. 7 is an exploded view of a retainer assembly in accordance with a further embodiment of the invention.
Figure 8:
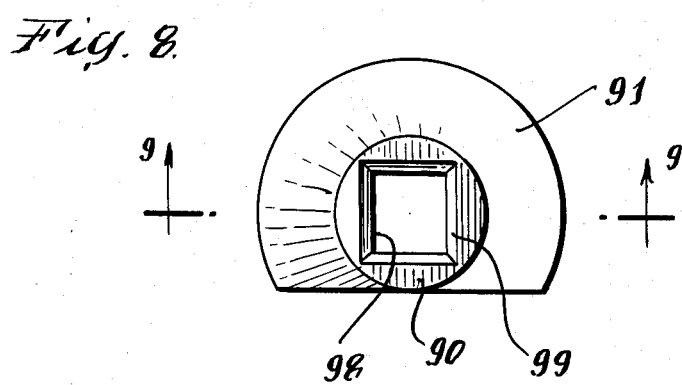
FIG. 8 is end view of a portion of the retainer assembly of FIG. 7.
Figure 9:
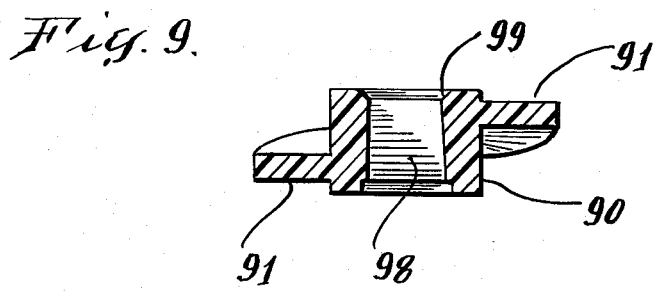
FIG. 9 is a cross sectional view of the portion of the retainer assembly illustrated in FIG. 8.

In the embodiment of the invention illustrated in FIGS. 7-9, the hub 90 is provided with a ramp or spiral projection 91 as in the arrangement of FIGS. 2-4. In this embodiment of the invention, however, the pin 92 has a central shank portion 93 with square cross section, the section 93 having a length substantially equal to the axial length of the hub 90. A short end portion 94 on the pin has a circular cross section for being received in the frame, this portion preferably being chamfered. The other end portion 95 has an enlarged diameter and is slotted, for receiving a screwdriver. In addition, a slot 96 extends partially axially through the pin from the end with the circular portion 94, and projections 97 extends from the pin on the two sides thereof not adjacent to the slot 96, at the junction of the portions 93 and 94.

As illustrated more clearly in FIG. 8, the hole 98 in the hub for receiving the pin has a square cross section of dimensions to permit the receipt therein of the square portion of the pin. As illustrated in FIG. 9, the walls of the hole 98 are slightly tilted with respect to the axis of the hub, and one end 99 of the hole 98 is outwardly beveled. With this construction, the pin 92 may be readily inserted in the other end of the hole 98, the narrowing walls gradually slightly closing the gap 96 as the pin is pushed through the hole 98, until the projections 97 have passed into the region of the bevel portion 99 to snap out. As a consequence, the pin may be readily assembled in the hub, during the assembly of the retaining arrangement in a panel. The snap connection simplifies the assembly procedure, while still enabling firm holding of the pin the hub.

While, as above discussed, the panel may be provided with a plow or the like into which the spiral ramp extends, the provision of such a plow may be omitted in the mounting of thin panels, wherein the ramp engages the rear of the panel.

While the invention has been disclosed and described with reference to a limited number of embodiments, it is apparent that variations and modifications may be made therein, and it is therefore intended in the following claims to cover each such variation and modification as falls within the true spirit and scope of the invention.

What is claimed is:

1. In a door assembly including a panel, a frame having an opening for receiving the panel, the frame being rabbeted surrounding the opening to provide a shoulder engaging said panel and inhibiting displacement of said panel in one direction from said opening, said panel having a groove in a peripheral edge thereof and directed towards said frame, said frame having a mortise adjacent said groove, and holding. means rotatably mounted in said mortise and having a projection extending into said groove only at determined angular displacements of said holding means for holding said panel to said frame; the improvement wherein said holding means comprises a solid hub having an axes and a radius, said projection comprising a spiral ramp having a substantially rectangular cross section and extending radially from said hub for substantially its entire length, the ends of said ramp terminating in a plane parallel to the axis of said hub and spaced from said axis a distance substantially equal to the radius of said hub, whereby said projection does not extend on the side of said plane opposite to said axis, further comprising an insert, one end of said insert being substantially D-shaped and having a central hole, said insert having a central portion comprised of walls extending from said one end thereof normal to a plane of said one end thereof, to define a D-shaped chamber open at the side opposite said one end of said insert and adjacent the straight portion of said one end of said insert, said insert further having a flange extending from the other end of said central portion, said mortise having a first portion for receiving said flange and a second portion abutting said central portion of said insert with said one end of said insert adjacent to the side of said frame opposite said shoulder, said hub being positioned within said chamber and having an axial extension extending into said central hole of said insert.

2. The door assembly of claim 1 wherein said extension of said hub has a slot for receiving a screwdriver.

3. The door assembly of claim 1 wherein said flange has a substantially D-shaped outer periphery.

4. The door assembly of claim 1 wherein said first and second portions of said mortise are substantially D-shaped, and substantially conform in shape to said flange and one end portion of said insert respectively.

* * * * *